(12) United States Patent
White et al.

(10) Patent No.: US 12,208,654 B2
(45) Date of Patent: Jan. 28, 2025

(54) TRAILER HITCH SECURITY SYSTEM

(71) Applicants: Stephen M White, San Antonio, TX (US); Chase A White, San Antonio, TX (US)

(72) Inventors: Stephen M White, San Antonio, TX (US); Chase A White, San Antonio, TX (US)

(*) Notice: Subject to any disclaimer, the term of this patent is extended or adjusted under 35 U.S.C. 154(b) by 636 days.

(21) Appl. No.: 17/504,559

(22) Filed: Oct. 19, 2021

(65) Prior Publication Data
US 2022/0055431 A1 Feb. 24, 2022

Related U.S. Application Data (63) Continuation-in-part of application No. 16/822,295, filed on Mar. 18, 2020, now abandoned.

(51) Int. Cl.
*B60D 1/58* (2006.01)
*B60D 1/52* (2006.01)

(52) U.S. Cl.
CPC ............... *B60D 1/58* (2013.01); *B60D 1/52* (2013.01)

(58) Field of Classification Search
CPC .............. B60D 1/58; B60D 1/52; B60D 1/60
See application file for complete search history.

(56) References Cited

U.S. PATENT DOCUMENTS

| | | | | |
|---|---|---|---|---|
| 4,570,408 | A * | 2/1986 | Frascaroli | E04B 1/5831 52/843 |
| 5,000,067 | A * | 3/1991 | Kolbusz | B25B 13/485 81/436 |
| 7,007,967 | B2 * | 3/2006 | Goettker | B60D 1/155 280/479.2 |
| 7,090,238 | B1 * | 8/2006 | Moore | B60D 1/60 280/507 |
| 7,753,395 | B2 * | 7/2010 | Goettker | B60D 1/54 280/491.4 |
| 9,327,564 | B2 * | 5/2016 | Breeden | B60D 1/52 |
| 2011/0036129 | A1 * | 2/2011 | Frantz | B60D 1/52 70/57 |
| 2013/0032621 | A1 | 2/2013 | Bogoslofski et al. | |

FOREIGN PATENT DOCUMENTS

WO 2004039632 9/2004

\* cited by examiner

*Primary Examiner* — Jacob D Knutson (57) ABSTRACT

An article of manufacture for preventing theft of trailer by unauthorized users after trailers are decoupled from authorized towing vehicles according to the present invention is disclosed. The present invention relates to a device and method for securing a non-motorized trailer from unauthorized movement by attaching a keyed tongue bar to an authorized vehicle and attaching a paired tongue receiver to the non-motorized trailer. If a vehicle does not have attached thereto the keyed tongue, the vehicle, i.e. unauthorized vehicle, will not be able to be attached to and move the trailer. The keyed tongue bar and paired tongue receiver have an abstract-shaped end and matched abstract-shaped opening, respectively.

14 Claims, 6 Drawing Sheets

TRAILER HITCH SECURITY SYSTEM

CROSS-REFERENCE TO RELATED APPLICATION

This application claims priority to U.S. patent application Ser. No. 16/822,680, titled "Trailer Hitch Security System," and filed on Mar. 18, 2020. The entire application is incorporated herein by reference in its entirety.

TECHNICAL FIELD

The present invention relates generally to systems for coupling trailers to towing vehicles. In a more specific, the invention relates to a device for preventing theft of trailer by unauthorized users after trailers are decoupled from authorized towing vehicles.

BACKGROUND

Many different configurations of hitching systems are known in the art for allowing a trailer to be readily coupled to and decoupled from a towing vehicle. For example, a trailer can be attached to a vehicle through the use of a hitch ball attached to the rear of the towing vehicle and a socket hitch attached to the yoke of the trailer. To tow the trailer, the socket hitch receives the hitch ball and thus couples the trailer to the vehicle. When the trailer is decoupled from the vehicle, the socket hitch can be the recoupled to another vehicle. U.S. Pat. Publication No. 2013/0032621 teaches a towing assembly including a tongue (which attaches to a towing vehicle) and a receiving portion, wherein the tongue is inserted into the receiving portion.

The problem with the above example prior art system, Publication 2013/0032621 is when a trailer is decoupled from a vehicle, it can be easily attached to another unauthorized vehicle and hauled by that unauthorized vehicle. Thus, nonowners of the trailer can attach their vehicle to the trailer as long as the nonowners vehicle has a standard hitch ball attached to it. As a lock is specified for a particular key, the present invention solves a long felt need by requiring trailer hitch to be specified for a particular corresponding socket. PCT Application WO 2004/039632 teaches a method for securing a trailer after being unattached from a vehicle. However, in the event a second, unauthorized vehicle, possesses the tongue alike the tongue of the authorized vehicle, the trailer may be towed away by the unauthorized vehicle Therefore, a need exists for an article of manufacture for preventing theft of trailer by unauthorized users after trailers are decoupled from authorized towing vehicles. The present invention attempts to address the limitations and deficiencies in prior solutions according to the principles and example embodiments disclosed herein.

SUMMARY

In accordance with the present invention, the above and other problems are solved by providing an article of manufacture for preventing theft of trailer by unauthorized users after trailers are decoupled from authorized towing vehicles according to the principles and example embodiments disclosed herein.

In one embodiment, the present invention is an article of manufacture for preventing theft of trailer by unauthorized users after trailers are decoupled from authorized towing vehicles.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

This application relates in general to an article of manufacture for providing vehicle security devices, and more specifically, to an article of manufacture for preventing theft of trailer by unauthorized users after trailers are decoupled from authorized towing vehicles according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components, but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual," and "user" refer to an entity, e.g., a human, using an article of manufacture for preventing theft of trailer by unauthorized users after trailers are decoupled from authorized towing vehicles according to the present invention. The term user herein refers to one or more users.

The term "invention" or "present invention" refers to the invention being applied for via the patent application with the title "Trailer Hitch Security System." Invention may be used interchangeably with hitch.

The term "security key" shall refer to an extension whose end can be varied in shape, specifically an abstract variable shape used to secure a hitch device to a tongue receiver coupled to a towable item such as a trailer.

The term "security receiver" shall refer to a hallowed block capable of internally accepting the security key.

The term "Hitch Pin" shall refer to a pin or other means of securing key into receiver.

The term "trailer" shall refer to a non-motorized vehicle capable of being pulled by a powered vehicle.

The term "powered vehicle" shall refer to a motorized vehicle, such as a car, snowmobile, motorcycle, tractor trailer, pickup truck, and the like.

The term "authorized" refers to a powered vehicle that has attached to it a keyed tongue specific for a paired tongue receiver attached to a trailer.

The term "unauthorized" refers to a powered vehicle that has attached to it or in its possession a security key that is not paired to a security receiver.

The term "embodiments" refers to all commonly known or proprietary trailer coupling systems such as Ball Hitch, Pintle, $5^{th}$ wheel, and gooseneck systems.

In general, the present disclosure relates an article of manufacture for preventing theft of trailer by unauthorized users after trailers are decoupled from authorized towing vehicles according to the present invention. As used here in the term security key shall refer to an extension whose end can be varied in shape, specifically an abstract variable shape. The security receiver is to be matched to a tongue receiver, wherein the keyed tongue is specific for insertion into the opening of the tongue receiver.

Figure 1:
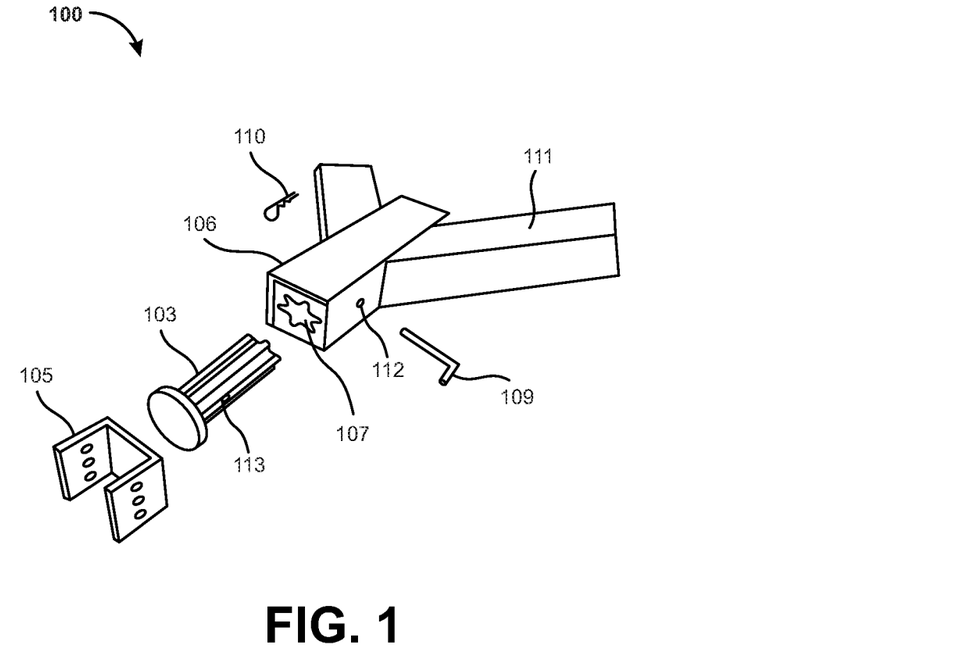
FIG. 1 illustrates an embodiment of an article of manufacture showing the keyed tongue and paired tongue receiver for preventing theft of trailer by unauthorized users after trailers are decoupled from authorized towing vehicles according to the present invention.

With reference to the FIGs, FIG. 1 is an embodiment of the present invention wherein a device includes a security receiver and keyed tongue 103 having an abstract-shaped end on one part and an attachment means 105 on its opposite end. The attachment means 105 is used for attaching to a powered vehicle (not shown).

The security key 103 can be made of any material, preferably metal. The attachment means 105 can be a variety of attachment mechanisms, in a preferred embodiment the attachment means 105 attaches by physical means, such as screws or bolts. The abstract-shaped end of the keyed tongue 103 can be formulated as a key, for example a door key, meaning it possesses an ill-determined shape specified only by the whims of the cutting device. The device as shown in FIG. 1 further includes a tongue receiver portion 106 whereby the tongue receiver portion 106 is attached to a trailer (not shown). The tongue receiver portion 106 has a hollowed opening whereby the opening 107 can accept the keyed tongue 103. Upon insertion of the keyed tongue 103 into the opening 107, the keyed tongue 103 is locked in place using a hitch pin 109 through pin holes 112-113, wherein lock is achieved through the use of a clip 110 or other locking device. The tongue receiver portion 106 further includes at least one arm 111 to provide sufficient support and attachment to the trailer (not shown).

Any party, which can be the driver of a vehicle, whereby the vehicle has thereon or in its possession a keyed tongue can be considered an authorized user for towing away a matched trailer. In this case it is the trailer that has modified with the integral receiver (welded on or otherwise permanently attached), and the vehicle is employing a stock hitch system.

Figure 2:
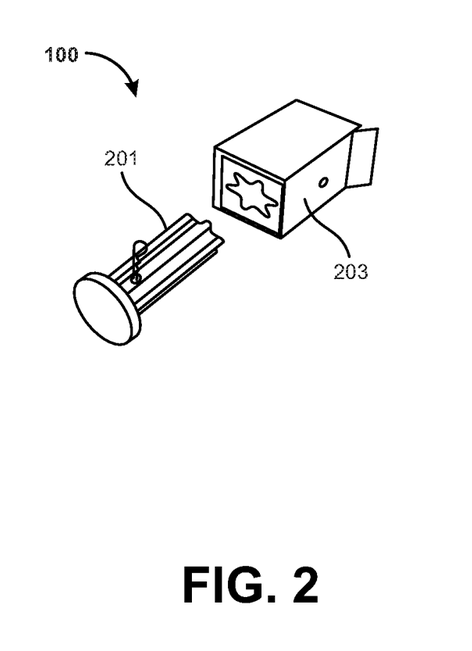
FIG. 2 illustrates an article of manufacture showing the keyed tongue and paired tongue receiver for preventing theft of trailer by unauthorized users after trailers are decoupled from authorized towing vehicles according to the present invention.

FIG. 2 illustrates an article of manufacture of the keyed tongue and the accepting tongue receiver. As shown the portion to be inserted into tongue receiver 203 of the keyed tongue 201 is abstractly shaped. The keyed tongue 201 is defined to be paired to the receiver by either standard geometries such as star or octagon shapes as well as non-uniform shape that can be altered either by random adjustments or parametric adjustments. The keyed tongue 201 with its abstract shape is designed to fit within the opening of the receiver 203. The opening of the tongue receiver 203 is matched to that of the keyed tongue 201.

The keyed tongue is attached to preferably an authorized powered vehicle while the paired tongue receiver 203 is attached to the trailer.

As a further embodiment of the present invention, the invention may be inserted between proprietary or commonly known trailer coupling systems such as hitch and ball of existing trailer systems. In other words, the present invention may serve as the intermediary, bringing additional security to trailer hitch systems.

Figure 3:
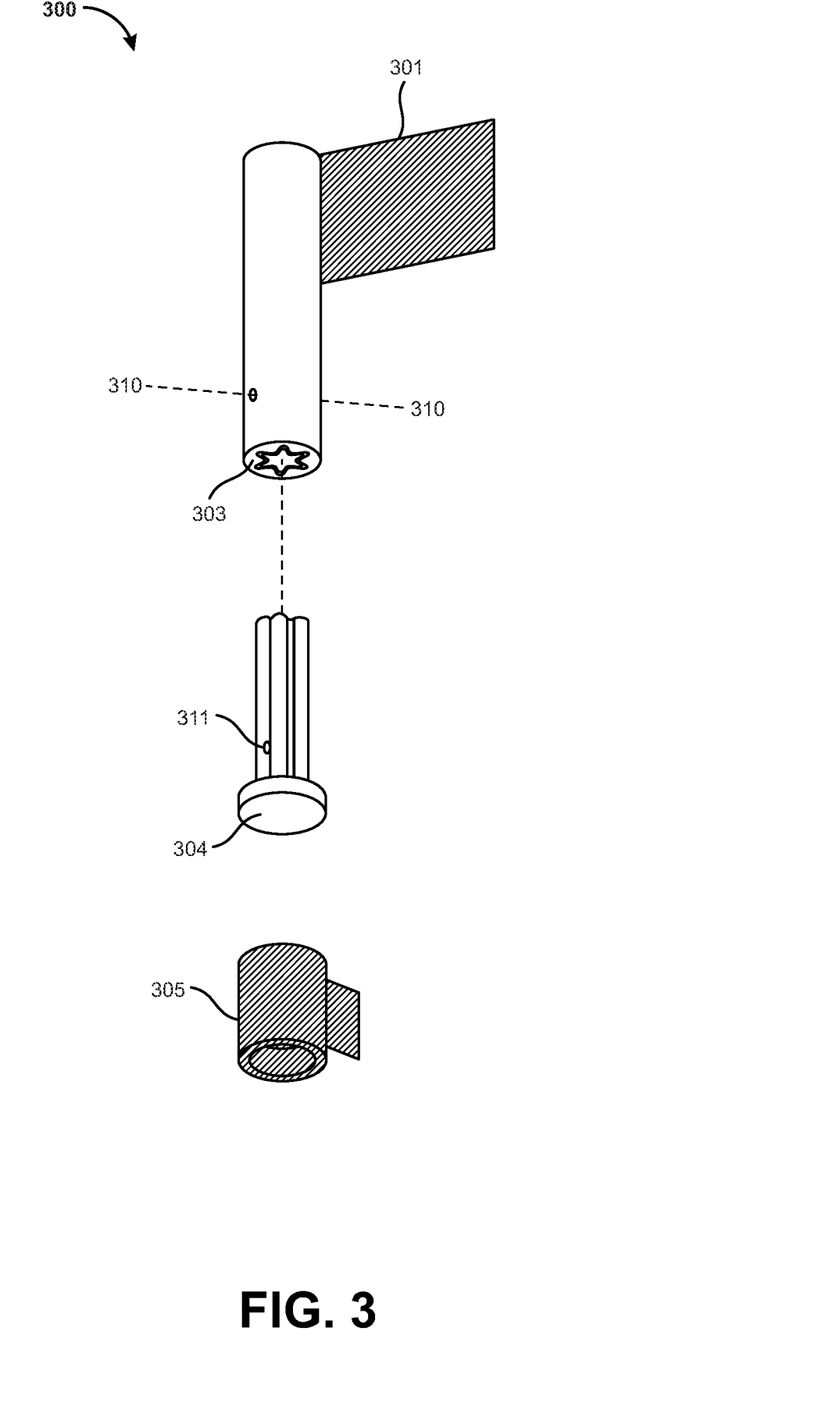
FIG. 3 illustrates an article of manufacture showing a gooseneck trailer embodiment for preventing theft of trailer by unauthorized users after trailers are decoupled from authorized towing vehicles according to the present invention.

FIG. 3 illustrates an article of manufacture showing a gooseneck trailer embodiment for preventing theft of trailer by unauthorized users after trailers are decoupled from authorized towing vehicles according to the present invention. A secure gooseneck hitch 300 to a gooseneck trailer 301 comprises a security receiver 303 attached to the trailer 301, a security key 304 that is inserted into the security receiver 303, and a coupler head 305 coupled to the security key 304. A pin hole 310 through the security receiver 303 aligns with a pin hole 311 in the security key 304 when the security key is inserted into the security receiver. A locking pin (not shown) may be inserted through the aligned pin holes 310-311 to secure the security key 304 and its attached gooseneck trailer coupler head 305 to the trailer 301.

When the security key 304 and gooseneck trailer coupler head 305 are coupled within the security receiver 303, the gooseneck trailer coupler head 305 may be connected to a towing vehicle in a usual fashion. When the security key 304 and gooseneck trailer coupler head 305 are removed from the security receiver 303 the trailer 301 cannot be attached to any towing vehicle because of the lack of a hitch to attach to the vehicle. If an unauthorized individual desires to tow the gooseneck trailer 301 away from its current location, a security key 304 that matches the security receiver 303 and a gooseneck coupler head 305 would be needed. As otherwise disclosed herein, the security receiver 303 and mating security key 304 may be arranged in include a unique mating pattern that would not be easily obtained or fabricated, thus preventing the gooseneck trailer from being improperly moved.

Figure 4:
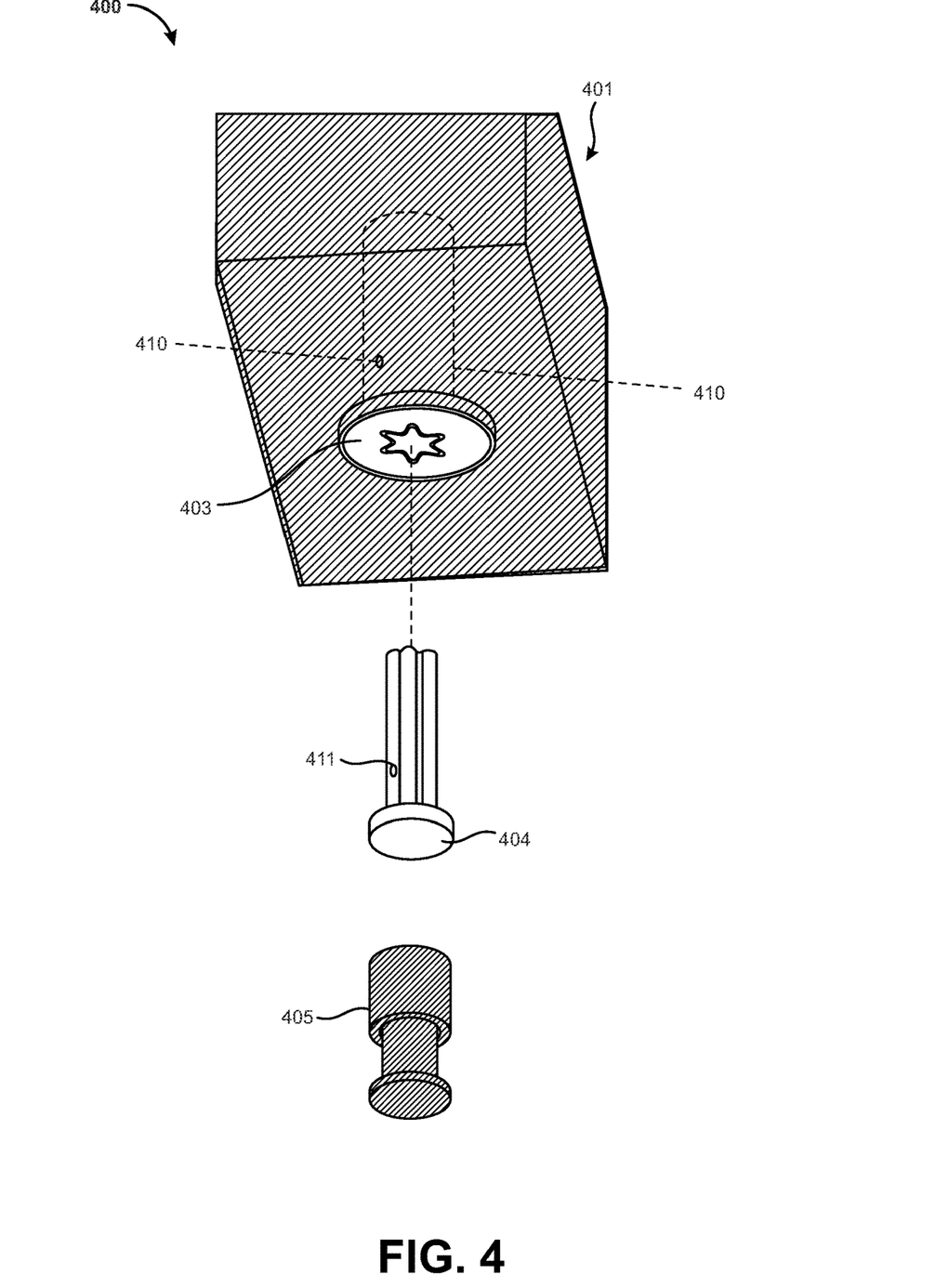
FIG. 4 illustrates an article of manufacture showing a $5^{th}$ wheel trailer embodiment for preventing theft of trailer by unauthorized users after trailers are decoupled from authorized towing vehicles according to the present invention.

FIG. 4 illustrates an article of manufacture showing a $5^{th}$ wheel trailer embodiment for preventing theft of trailer by unauthorized users after trailers are decoupled from authorized towing vehicles according to the present invention. The $5^{th}$ wheel trailer embodiment 400 of the secure hitch comprises a security receiver 403 contained therein is coupled to an underside of the $5^{th}$ wheel trailer 401. The security receiver 403 accepts a mating security key 404 having a $5^{th}$ wheel king pin 405 coupled to its lower end. The security key 404 is inserted into the security receiver 403 and a locking pin (not shown) is inserted through a pin hole 410 in the security receiver 403 and pin hole 411 in the security key 404 to secure the security key 404 and king pin 405 when the pin holes 410-411 align after the insertion is completed. Once the security key 404 is securely coupled within the security receiver 403, the $5^{th}$ wheel king pin 405 may be used in its ordinary fashion. This embodiment provides the same security to the $5^{th}$ wheel trailer 401 as described above with respect to the gooseneck trailer 301.

Figure 5:
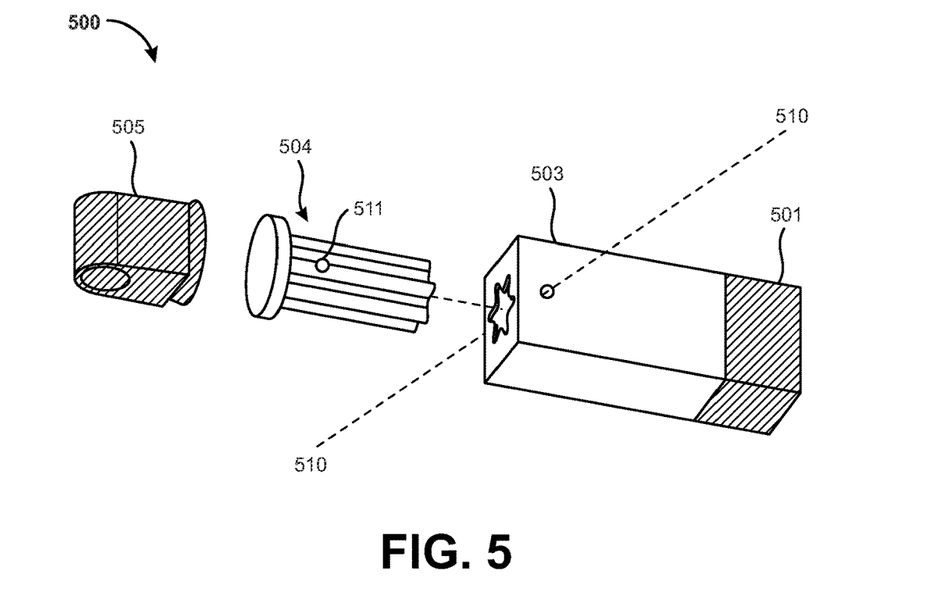
FIG. 5 illustrates an article of manufacture showing a bumper pull trailer security coupler having a paired receiver and key for preventing theft of trailer by unauthorized users after trailers are decoupled from authorized towing vehicles according to the present invention.

FIG. 5 illustrates an article of manufacture showing a bumper pull trailer embodiment for preventing theft of trailer by unauthorized users after trailers are decoupled from authorized towing vehicles according to the present invention. A bumper pull trailer hitch 500 comprises a security receiver 503 contained therein is coupled to an outward end of bumper pull trailer 501. The security receiver 503 accepts a mating security key 504 having a bumper pull trailer hitch 505 coupled to its end. The security key 504 is inserted into the security receiver 503 and a locking pin (not shown) is inserted through a pin hole 510 of the security receiver 503 and pin hole 511 in the security key 504 to secure the security key 504 and hitch 505 when the pin holes 510-511 align after the insertion is completed. Once the security key 504 is securely coupled within the security receiver 503, the bumper pull trailer hitch 505 may be used in its ordinary fashion. This embodiment provides the same security to the bumper pull trailer 501 as described above with respect to the gooseneck trailer 401 and with respect to the $5^{th}$ wheel trailer 401.

Figure 6:
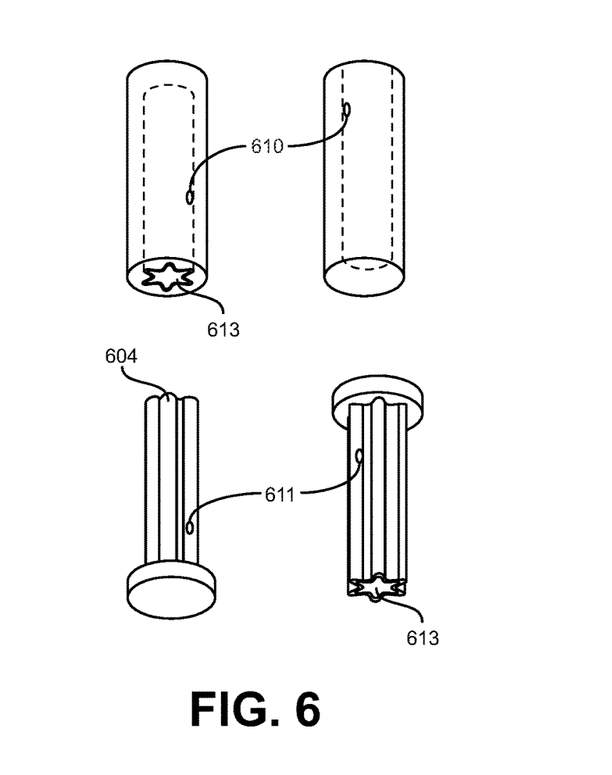
FIG. 6 illustrates an article of manufacture for preventing theft of trailer by unauthorized users after trailers are decoupled from authorized towing vehicles according to the present invention.

FIG. 6 illustrates an article of manufacture showing an in-series trailer security coupler having a paired receiver and key for preventing theft of trailer by unauthorized users after trailers are decoupled from authorized towing vehicles according to the present invention. All of the disclosed embodiments utilize a security receiver 603 that mates with an attached trailer. A mating security key 604 is configured to match the security receiver 603 permitting it to be inserted into the security receiver 603. As noted above, the shape of the security key 604 and the security receiver 603 is typically unique to each trailer and its corresponding hitch in a same way that vehicle keys are unique to a particular vehicle.

The security key 604 and the security receiver 603 are secured together with a locking pin (not shown) that is inserted through a set of pin holes 610-611 as described above. The locking pin may be any type of locking pin that fits through the set of pin holes 610-611 and may not be removed while in use. The locking pin may be secured with additional locking mechanisms to prevent its removal while the hitch is attached.

The security key 604 has an insertion end 613 that is shaped to match the security receiver 603. The insertion end 613 may include either a hollow or solid spine that matches the security receiver 603. A mounting flange 614 is coupled to an opposing end of the security key 604 to permit the security key 604 to be physically coupled to an appropriate hitch 305, 405, 505 for the type of trailer to be towed.

Figure 7:
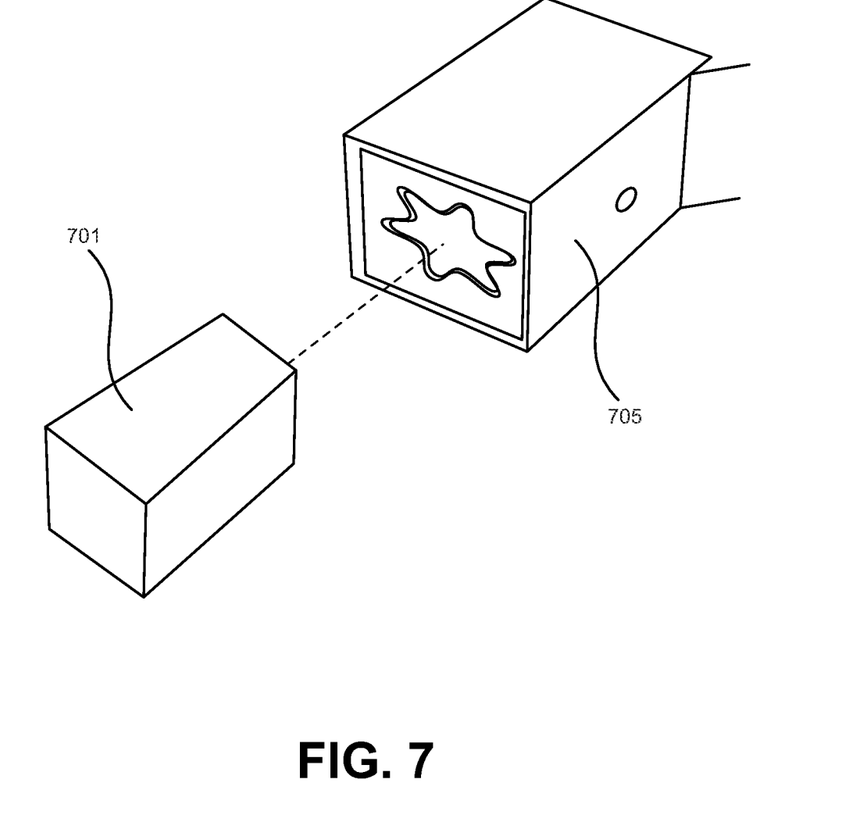
FIG. 7 illustrates an unauthorized attempt to attach an unpaired tongue to a receiver using an article of manufacture for preventing theft of trailer by unauthorized users after trailers are decoupled from authorized towing vehicles according to the present invention.

FIG. 7 is an embodiment of an unpaired tongue 701 not capable of fitting into the tongue receiver 705 of a trailer. As shown, in the event a vehicle has attached a standard tongue 701, which includes a tongue that is square shaped, rectangular shaped, or just does not fit within the tongue receiver, it will not be able to fit into the opening of the tongue receiver 705. Thus, the present invention provides security means as in the event an unauthorized user has a tongue that cannot fit within the opening of the tongue receiver, the trailer will not be able to be moved by the unauthorized vehicle.

It should be further noted that the hitch pairing system may be applied to the vehicle side enabling a paired hitch to be disconnected from the motorized vehicle to authorize or deauthorize a vehicle from being able to tow the trailer.

Figure 8:
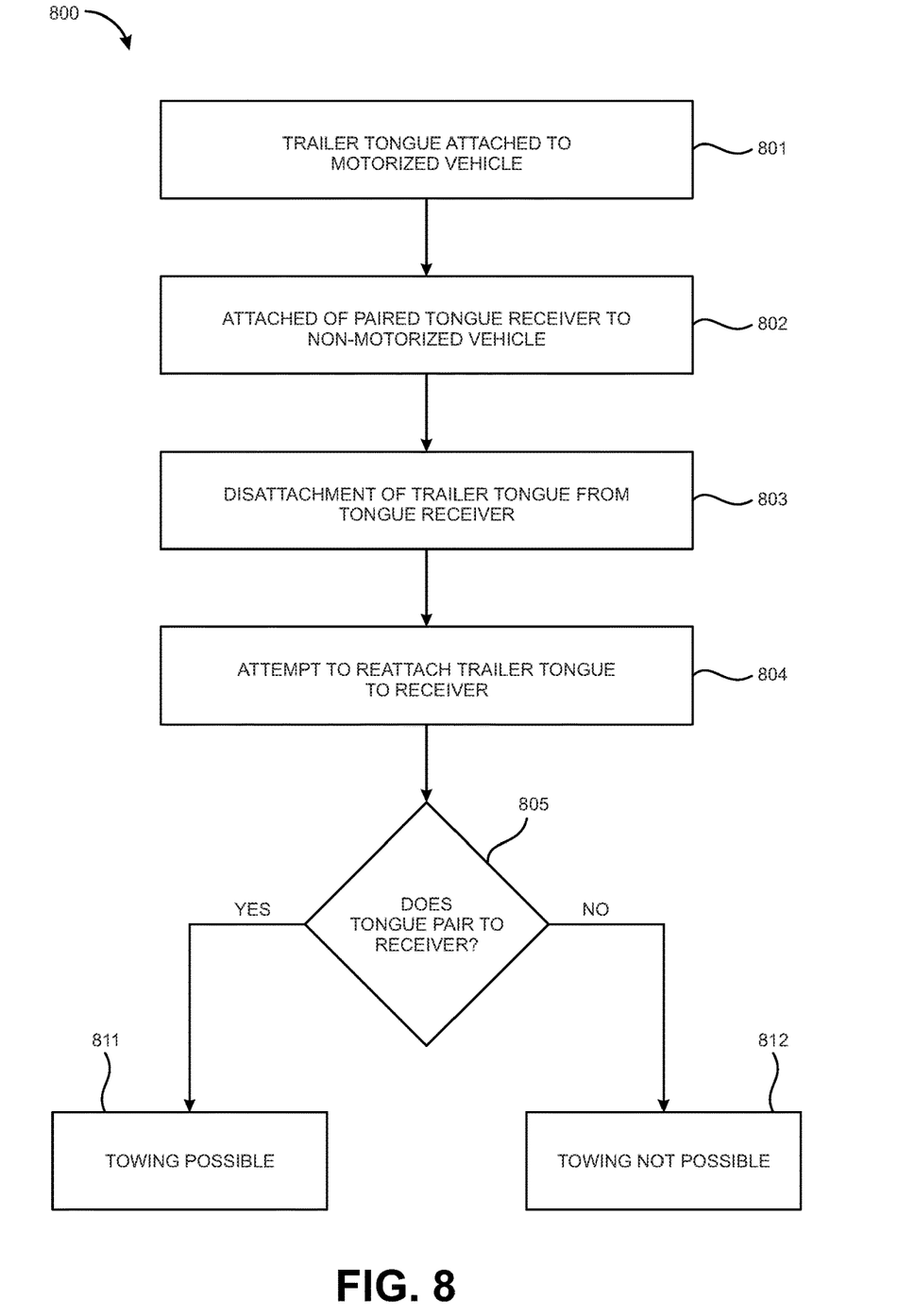
FIG. 8 illustrates an embodiment of the method of using an article of manufacture for preventing theft of trailer by unauthorized users after trailers are decoupled from authorized towing vehicles according to the present invention.

FIG. 8 is a method of the present invention whereby a keyed tongue is fit within a specific paired tongue receiver in order to allow movement of trailer by an authorized vehicle. In the method of the present invention, a keyed trailer tongue is attached to a motorized vehicle 801. A paired tongue receiver is attached to a trailer 800 wherein the paired tongue receiver is matched to the keyed trailer tongue 802. Match being referred to the keyed trailer tongue is able to fit inside the hollow space opening of the paired tongue receiver. Upon movement of the trailer, the vehicle may be unattached from the trailer by removing of a pin which allows the keyed trailer tongue to be removed from the hollow space opening of the paired tongue receiver 803. If it is desirable to move the trailer again by the authorized vehicle, the vehicle having the keyed trailer tongue is then moved into place 804. In the event that keyed trailer tongue can fit within the tongue receiver 805, the trailer can then be moved by the motorized vehicle 811. In the event that the trailer tongue cannot fit within the hollow space opening of the tongue receiver 805, the trailer cannot be moved by the motorized vehicles 812. In this way, the trailer is protected and secured from being moved by unauthorized vehicles and unauthorized users.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A device for attaching a non-motorized trailer to a towing vehicle, the device comprising:
   a first half device for attaching to the towing vehicle, the first half device comprising a keyed tongue and configured with provisions for an attachment means for attaching the first half device to the towing vehicle; and
   a second half device for attaching the towing vehicle to the non-motorized trailer, the second half device configured to be affixed to at least one point of attachment to the non-motorized trailer, the second half device having an opening that is matched to the keyed tongue of the first half device,
      wherein a lock pin can be inserted through a pin hole in the second half device and the keyed tongue when the keyed tongue is inserted in the opening of the second half device, and
      wherein a cross section shape of the keyed tongue of the first half device has been shaped as a non-uniform shape predetermined to serve as a unique security key that matches a shape of the opening of the second half device.

2. The device of claim 1, wherein the attachment means for attaching the first half device comprises one of a hitch system, welds, or drilled holes for accepting bolts or pins.

3. The device of claim 1, wherein the towing vehicle is a motorized vehicle.

4. The device of claim 1, wherein the second half device is configured so that the second half device becomes a permanent or demountable attachment to the non-motorized trailer.

5. The device of claim 1, wherein the cross section shape of the keyed tongue comprises at least one of an irregular angle, a slant, and a circular side.

6. The device of claim 1, wherein the first half device is incorporated on the towing vehicle and the second half device is incorporated on the non-motorized trailer to be towed by the towing vehicle.

7. A method of protecting the non-motorized trailer from being towed by an unauthorized towing vehicle, using the device of claim 1, the method comprising:
   installing the second half device on the non-motorized trailer; and
   installing the first half device on the towing vehicle intended to be an authorized towing vehicle for towing the non-motorized trailer.

8. A trailer hitch system, comprising:
   a tongue receiver portion to be attached to a trailer to be towed, the tongue receiver portion including a first pin hole for insertion of a lock pin; and
   a keyed tongue portion to be attached to a vehicle for towing the trailer, the keyed tongue portion including a second pin hole for insertion of the lock pin,
      wherein the tongue receiver portion has an abstract-shaped opening that will uniquely receive an extension of the keyed tongue portion having a cross section shape that matches the abstract-shaped opening of the tongue receiver portion, and
      wherein the opening of the tongue receiver portion and the matching cross section shape of the keyed tongue portion has a unique shape predetermined to serve as a security key.

9. The trailer hitch system of claim 8, as inserted as an intermediary trailer coupling system between an existing, conventional hitch and ball trailer coupling system.

10. A method of protecting a non-motorized vehicle from being towed by an unauthorized towing vehicle, the method comprising incorporating a towing receptacle on the non-motorized vehicle that is paired with a keyed tongue that is incorporated on an authorized towing vehicle authorized to tow the non-motorized vehicle, such that only a towing vehicle with the paired keyed tongue can serve as authorized to tow the non-motorized vehicle.

11. The method of claim 10, wherein the towing receptacle on the non-motorized vehicle comprises an opening having a non-standard shape predetermined to serve as a security key and a cross section of the keyed tongue on the authorized towing vehicle matches the non-standard shape of the opening of the towing receptacle on the non-motorized vehicle.

12. A device for attaching a non-motorized trailer to a vehicle, the device comprising:
   a keyed tongue having a non-uniform shape;
   an attachment means for attaching the keyed tongue to the vehicle;
   a security receiver fixedly attached to the trailer, wherein the security receiver comprises an opening for receiving the keyed tongue, and wherein the opening has an opening shape that matches the non-uniform shape of the keyed tongue; and
   a lock pin configured to be inserted through the keyed tongue and the security receiver in order to removably couple the keyed tongue to the security receiver.

13. The device of claim 12, wherein the non-uniform shape comprises at least one of: an irregular angle, a slant, and a spherical side.

14. The device of claim 12, wherein the attachment means is configured for attaching the keyed tongue to a stock hitch system.

* * * * *